H. D. COLMAN.
WARPING APPARATUS.
APPLICATION FILED MAY 27, 1912. RENEWED AUG. 11, 1916.

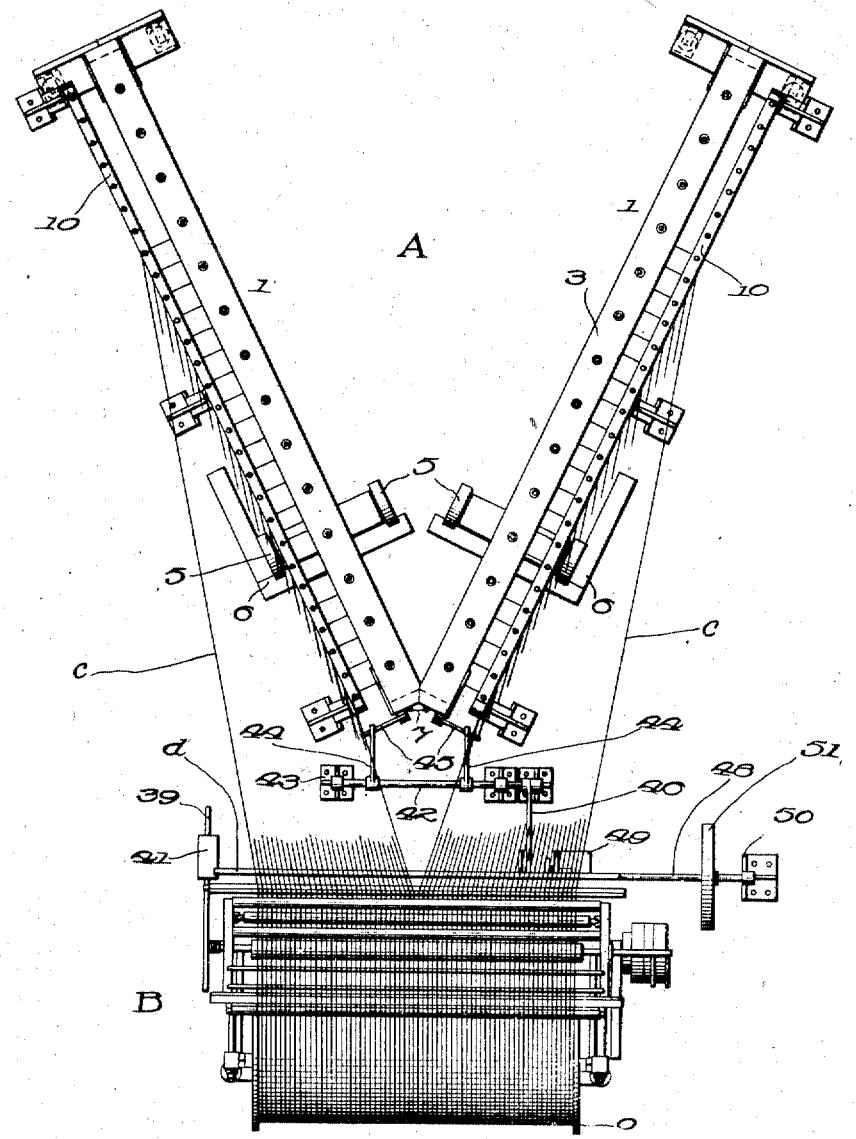

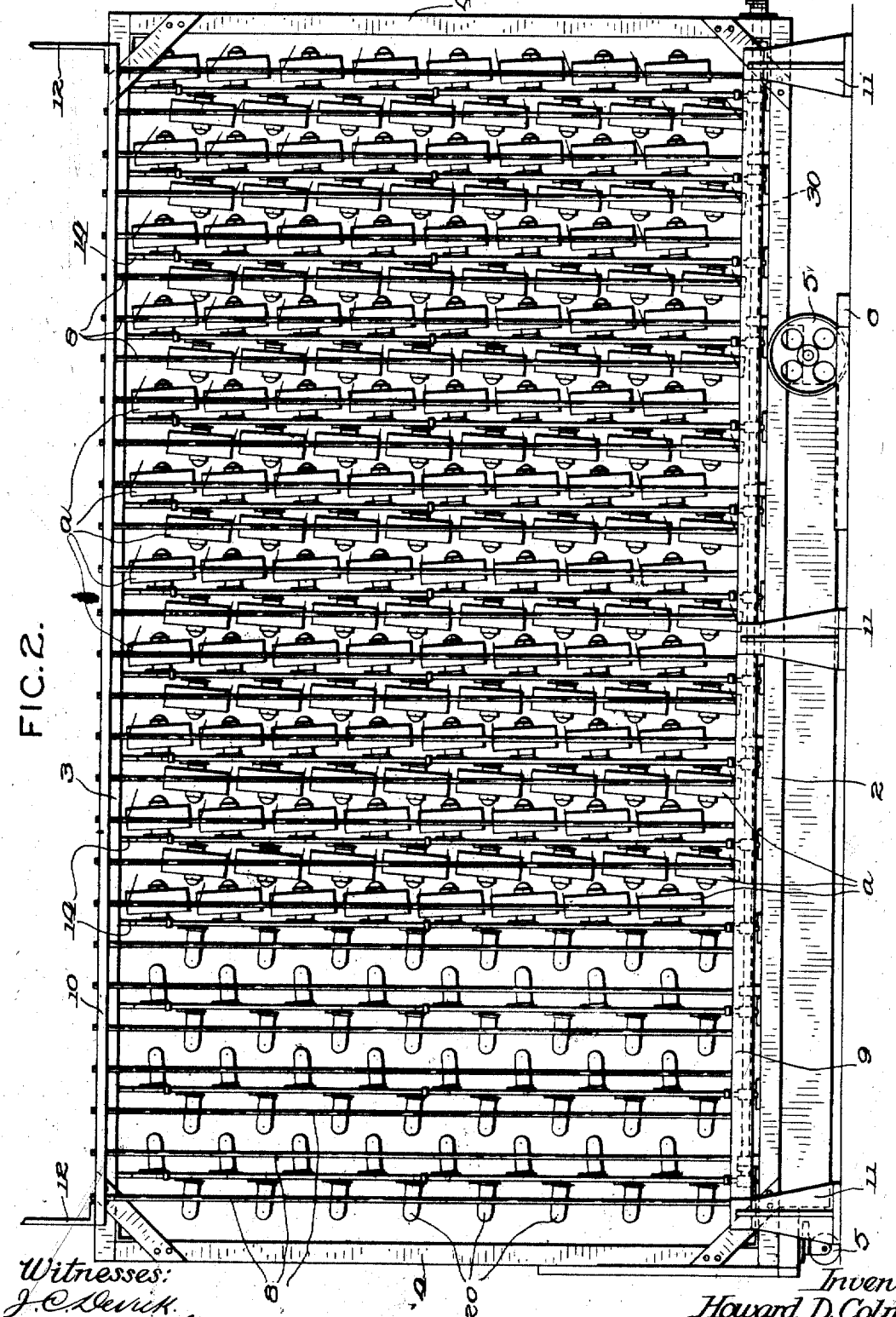

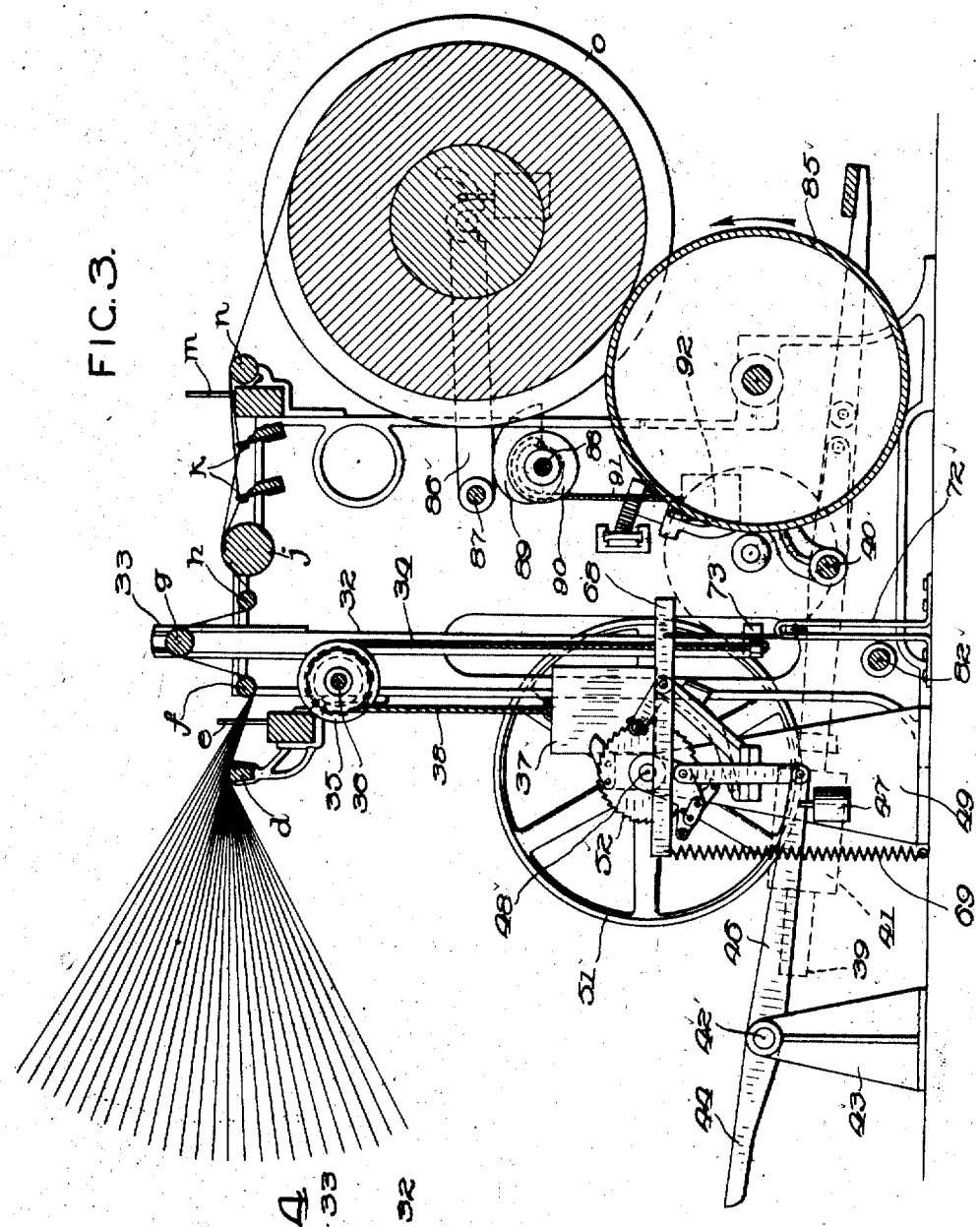

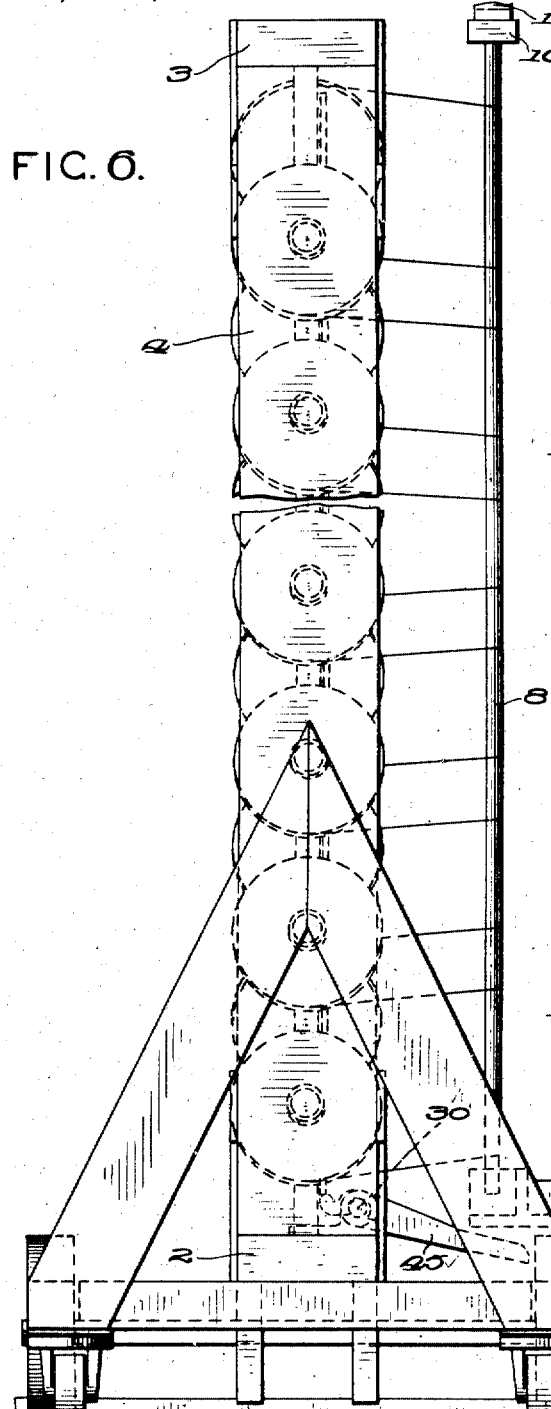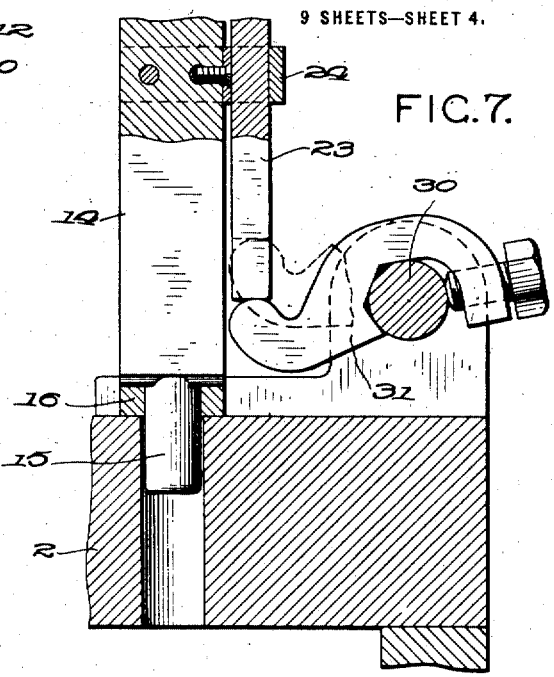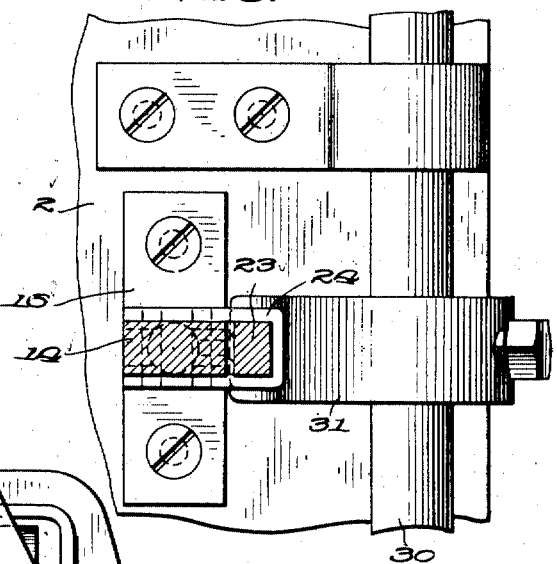

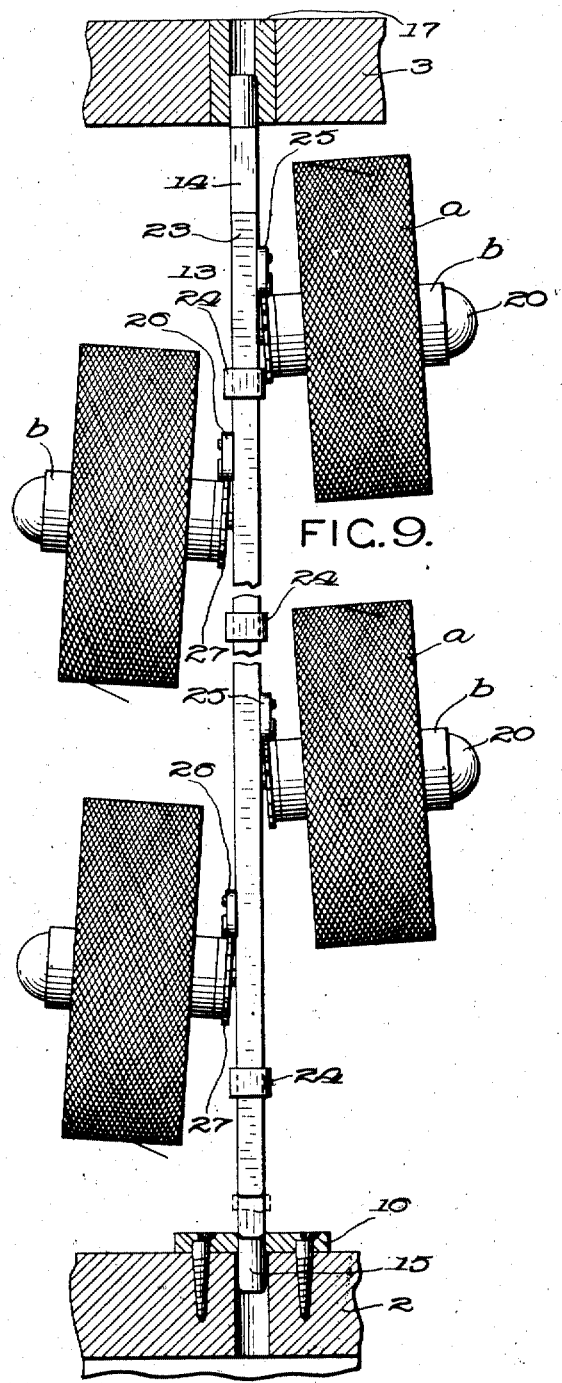
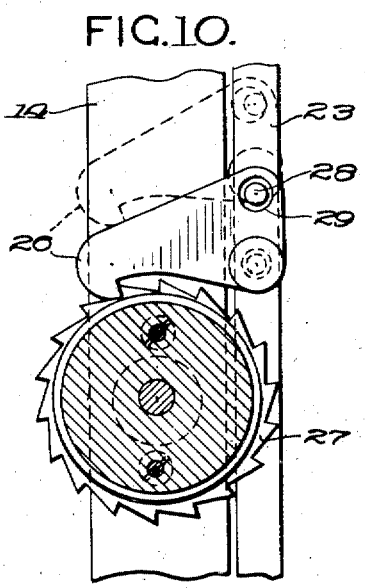
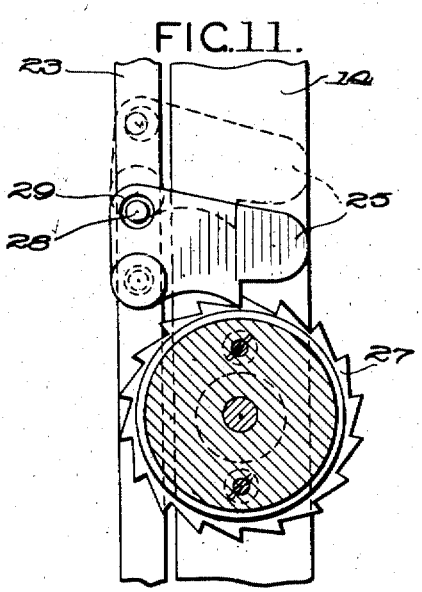

1,208,295.

Patented Dec. 12, 1916.
9 SHEETS—SHEET 6.

Witnesses:
J. C. Derik.
Geo. L. Chindahl

Inventor:
Howard D. Colman
By Luther L. Miller
Atty.

H. D. COLMAN.
WARPING APPARATUS.
APPLICATION FILED MAY 27, 1912. RENEWED AUG. 11, 1916.

1,208,295.

Patented Dec. 12, 1916.
9 SHEETS—SHEET 7.

Witnesses:

Inventor:
Howard D. Colman
By Luther L. Miller
Atty.

H. D. COLMAN.
WARPING APPARATUS.
APPLICATION FILED MAY 27, 1912. RENEWED AUG. 11, 1916.

1,208,295.

Patented Dec. 12, 1916.
9 SHEETS—SHEET 8.

UNITED STATES PATENT OFFICE.

HOWARD D. COLMAN, OF ROCKFORD, ILLINOIS, ASSIGNOR TO HIMSELF, LUTHER L. MILLER, AND HARRY A. SEVERSON, COPARTNERS DOING BUSINESS AS BARBER-COLMAN COMPANY, OF ROCKFORD, ILLINOIS.

WARPING APPARATUS.

1,208,295.             Specification of Letters Patent.       Patented Dec. 12, 1916.

Application filed May 27, 1912, Serial No. 699,902.    Renewed August 11, 1916.    Serial No. 114,477.

*To all whom it may concern:*

Be it known that I, HOWARD D. COLMAN, a citizen of the United States, residing at Rockford, in the county of Winnebago and State of Illinois, have invented certain new and useful Improvements in Warping Apparatus, of which the following is a specification.

This invention has reference to the production of warps, and particularly to the unwinding of relatively small yarn masses (such as those upon bobbins, spools and the like) onto a comparatively large container such as a section beam.

The primary object of the invention is to render possible a greatly increased speed of operation and thereby reduce the cost of production of cloth. This object is attained by providing means whereby, when the rotation of the section beam is arrested through the breakage of a thread or for any other cause, the continued rotation of the small yarn masses through momentum shall be quickly checked, and whereby the slack produced in the threads by such rotation of the small yarn masses before they come to rest shall be promptly and completely taken up.

Figure 12:
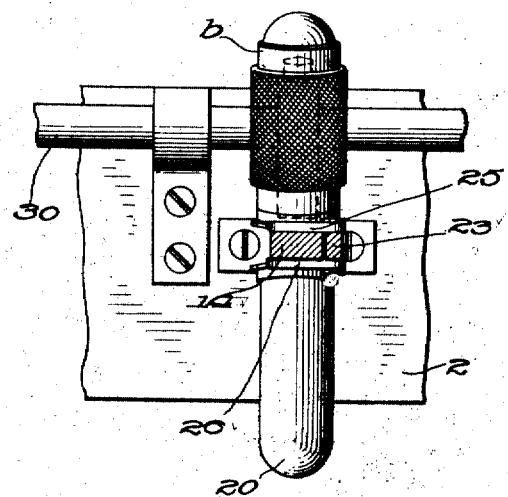
Figure 13:
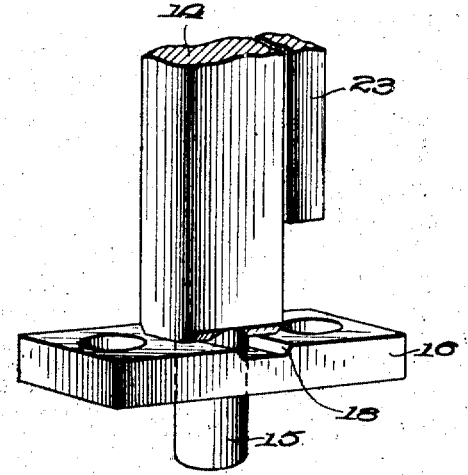
Figure 14:
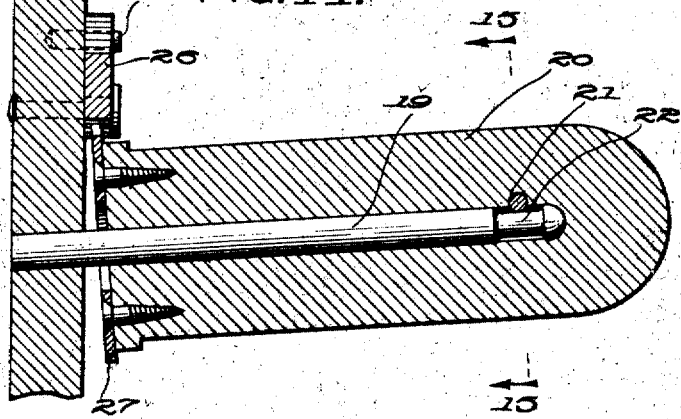
Figure 15:
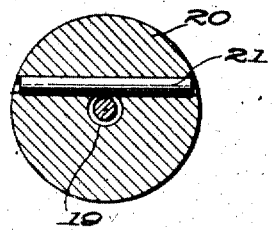
Figure 16:
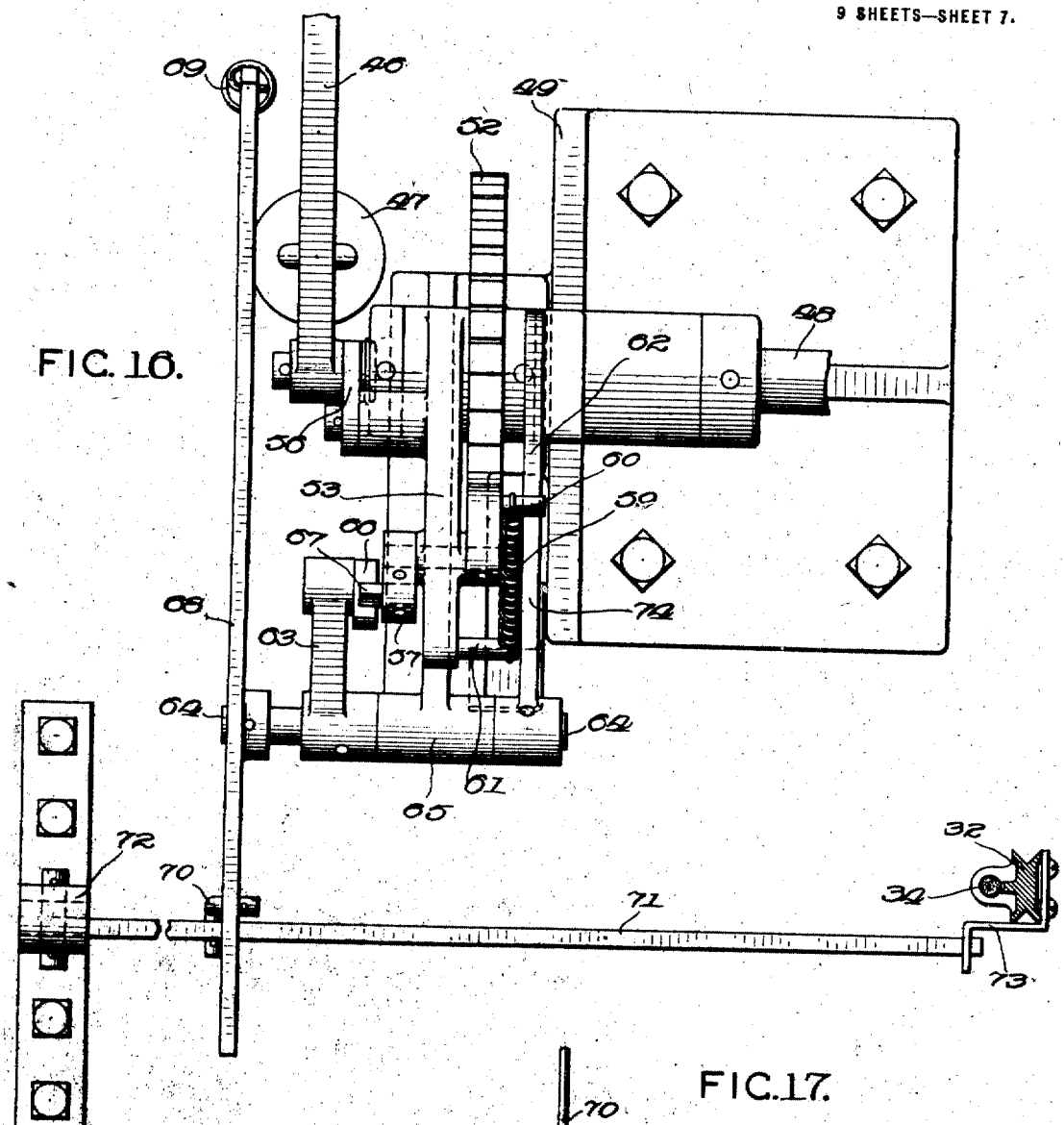
Figure 17:
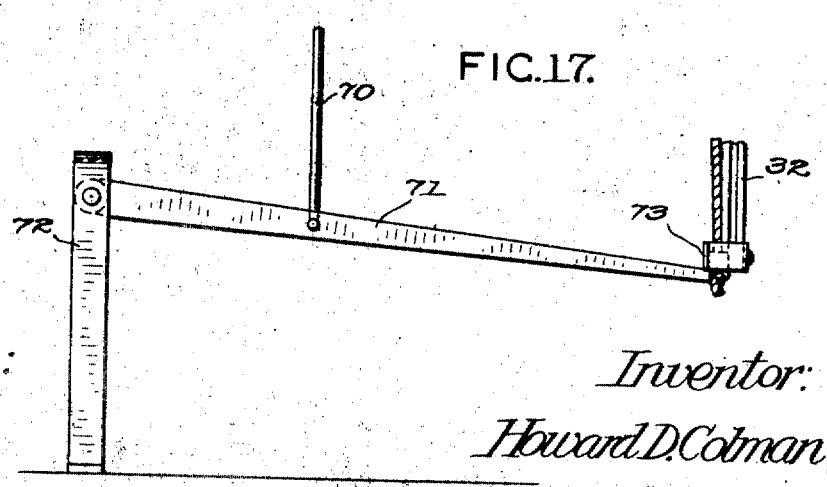
Figure 18:
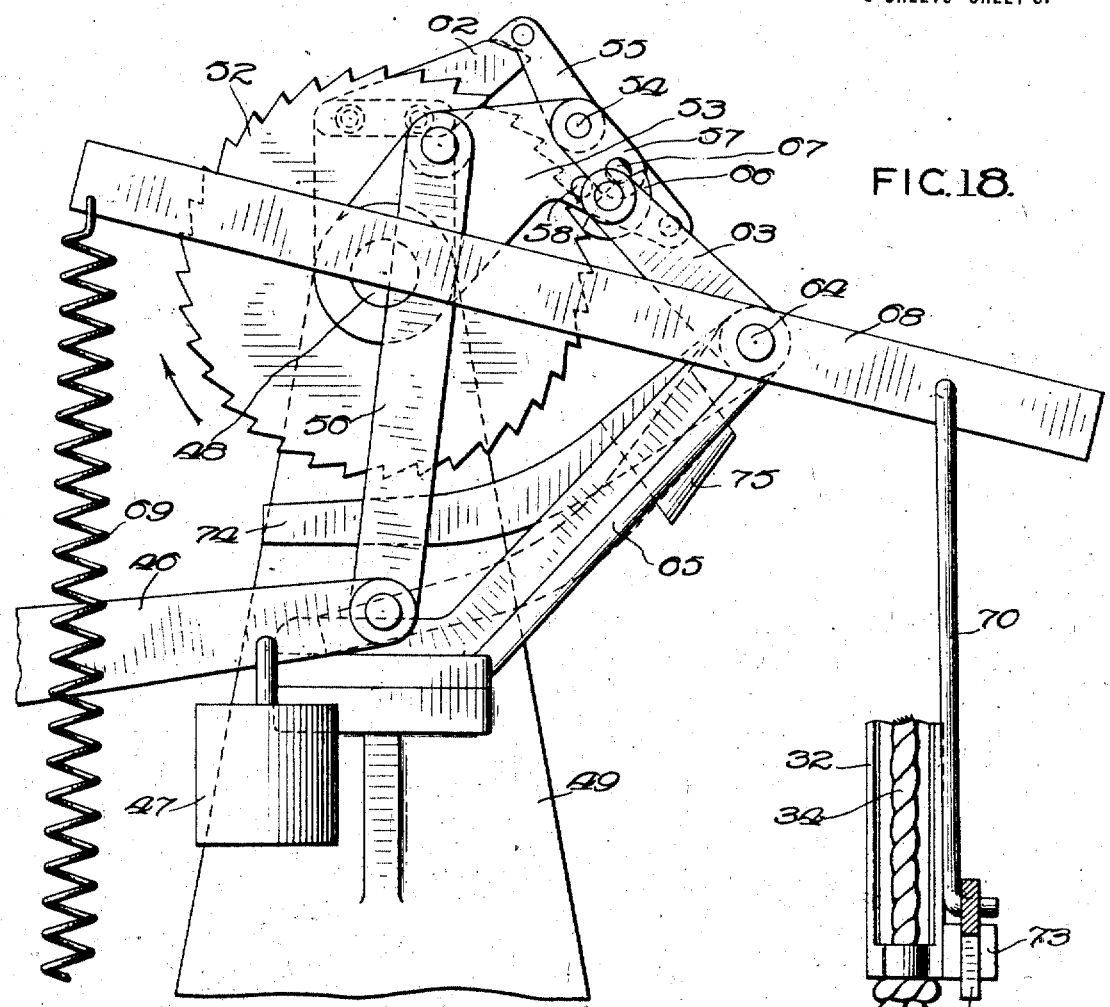
Figure 19:
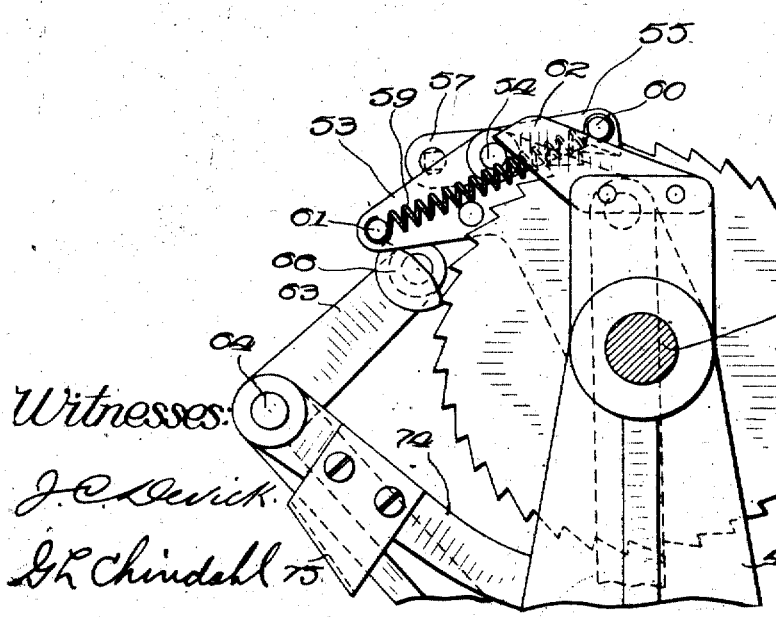
Figure 20:
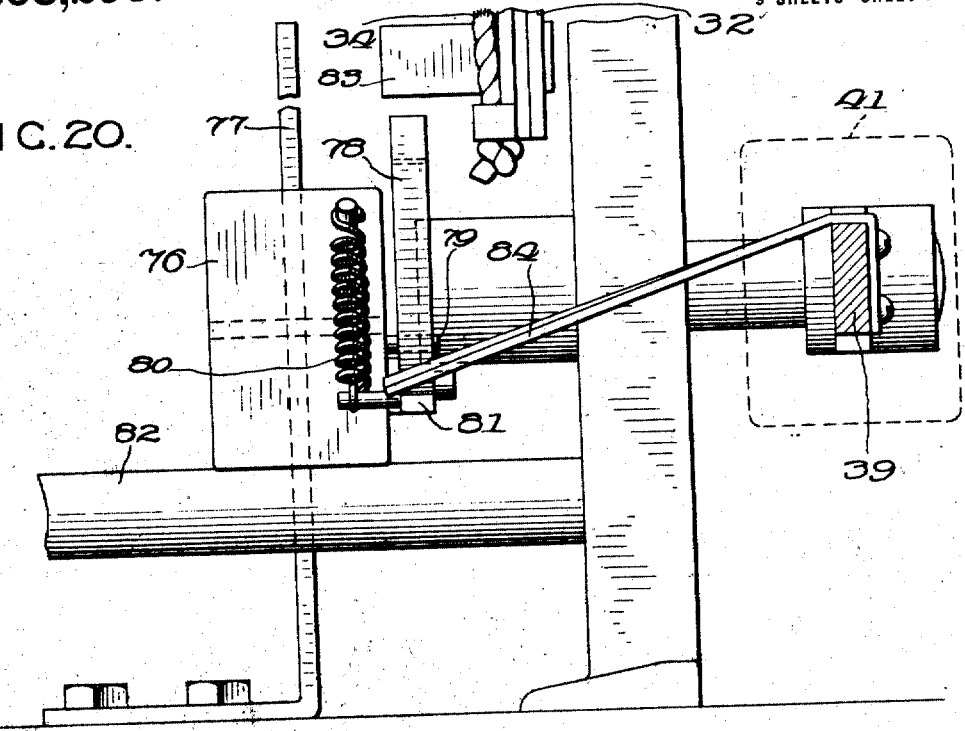
Figure 21:
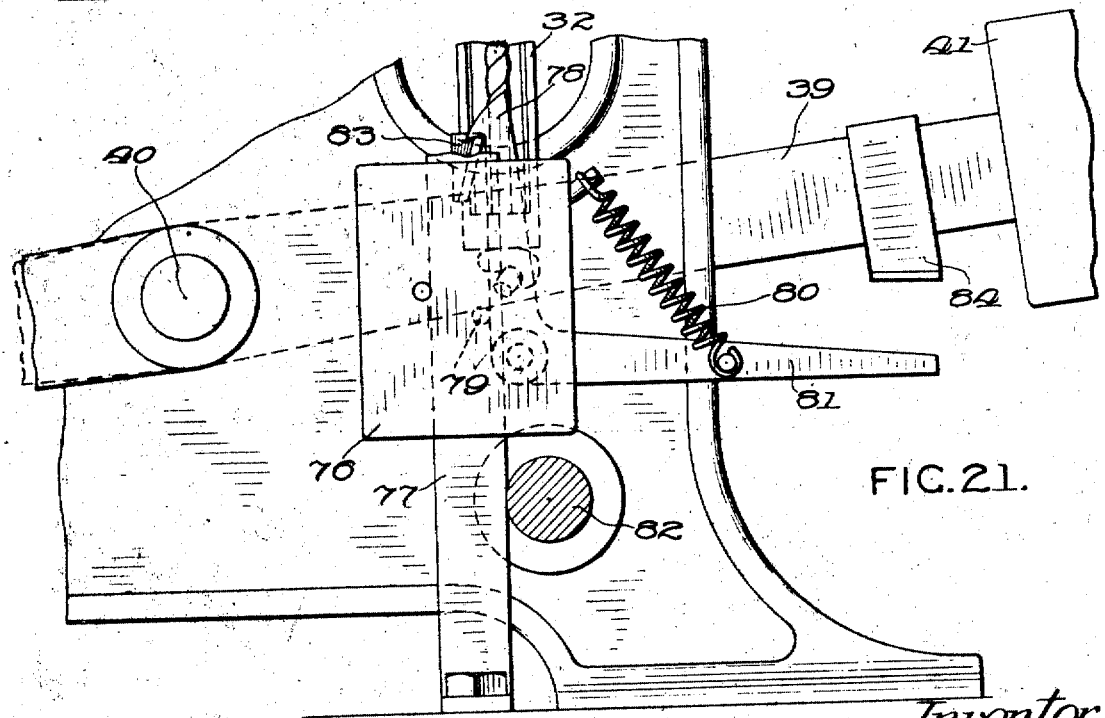

In the accompanying drawings, Figure 1 is a top plan view of one embodiment of my invention. Fig. 2 is a side elevation of one section of the creel. Fig. 3 is a longitudinal section of the warper proper. Fig. 4 is a sectional view of one of the guides for the rise roll. Fig. 5 is a view of a winding drum comprised in the machine. Fig. 6 is an end elevation of one of the creel-sections. Fig. 7 is a fragmental view illustrating the manner of mounting the "trees" on which the yarn masses to be unwound are supported, and a portion of the means for operating the creel brakes. Fig. 8 is a plan section of the parts shown in Fig. 7. Fig. 9 is a fragmental view of one of the trees above alluded to. Figs. 10 and 11 are detail views of the creel brakes. Fig. 12 is a horizontal sectional view through one of the trees. Fig. 13 is a perspective view illustrating the means to permit of turning the tree. Fig. 14 is a sectional view showing the means for rotatably supporting the cheeses. Fig. 15 is a section on line 15.15 of Fig. 14. Fig. 16 is a plan view illustrating a means for operating the creel brakes. Fig. 17 is an elevation of a portion of said means, on a smaller scale. Figs. 18 and 19 are fragmental elevations, from opposite sides, of a portion of said brake-operating means. Figs. 20 and 21 are elevations of a device for partially counterbalancing the rise-roll weights during the normal operation of the apparatus.

The embodiment which I have selected to illustrate the invention is arranged to operate upon yarn masses in the form known as "cheeses," because in that form of yarn mass the container is relatively light and may be mounted to rotate with great freedom, and because the radius of the yarn mass is greater than that of a spool. Such a yarn mass ($a$, Fig. 9) consists of yarn wound spirally upon a tubular core $b$ of metal or other suitable material. The invention, however, is not limited to use with yarn masses of the form mentioned.

The cheeses are rotatably supported in a creel A located behind the warper B. The strands of yarn $c$ extending from the cheeses pass over a guide rail $d$ which tends to bring the threads into the same plane, then through an expansion comb $e$ by which they are properly spaced apart. They then pass under a guide roll $f$ and over a rise roll $g$. The rise roll is arranged to take up the slack in the threads when the warper is stopped. The threads then pass under a guide roll $h$ and over a measuring roll $j$. The measuring roll actuates mechanism of any suitable or well-known character by which the length of the warp may be determed, and it is also arranged to stop the machine when a predetermined length has been wound. The threads then pass through drop wires or detectors $k$ which are arranged to operate mechanism of any ordinary or preferred form to stop the machine if a thread breaks. From the drop wires the threads pass through an expansion comb $m$, over a guide roll $n$ and thence to the section beam $o$ upon which they are wound to form the warp.

The creel shown herein by way of example is a V-shape structure consisting of two sections 1. Each section comprises a rectangular frame formed of the lower bar 2 (Fig. 2), the upper bar 3 and the end bars 4. For convenience in replenishing the cheeses, each section may, if desired, be mounted on rollers 5 so that when the cheeses have been unwound the section may be removed and a similar section provided with cheeses quickly substituted therefor. 6 are positioning stops to aid in properly locating the creel-sections. A hook and eye 7 (Fig. 1) may be used to hold the sections in operative position. Vertical thread-guiding rods 8 (Figs. 2 and 6) are supported adjacent to the operative positions of the creel-sections 1 by means of the lower bars 9, the upper bars 10, the floor brackets 11 and the ceiling brackets 12.

Each creel-section comprises a suitable number of "trees" 13 (Fig. 9) upon which the cheeses are rotatably supported, and for convenience in placing cheeses on said trees, the latter are arranged to be turned from the operative position shown in Figs. 2 and 9 to a position at a right angle thereto as indicated in Figs. 12 and 13. Each tree consists of a vertical bar 14 provided at its ends with pivots 15 journaled in a plate 16 on the bottom bar 2 and in a bearing bushing 17 in the top bar 3 of the creel-section. The plate 16 is grooved or recessed, as at 18 (Fig. 13), to receive the lower end of the bar 14 and thus hold the tree in its operative position. The side walls of the recess and the corresponding edges of the bar 14 are beveled or inclined so that the operator may readily turn the tree into the inoperative position for reloading. There is sufficient clearance between the upper end of the bar 14 and the bar 3 to permit of the slight longitudinal movement incidental to such turning movement. Upon the opposite sides of the bar 14 are fixed pivot pins 19 (Fig. 14) upon each of which is rotatably mounted a spindle 20 which may be formed of wood or other suitable material. The spindle is secured against displacement from the pivot pin 19 by means of a pin 21 driven into the spindle and extending into an annular groove 22 in the pivot pin. In order that the rapidly rotating cheese shall not leave the spindle, the pivot pin may be set in a slightly upwardly inclined position, as shown in the drawings. To further counteract any tendency of the cheese to fly off the spindle, the latter may be made slightly tapering, with its inner end portion of greater diameter than the outer end portion so that the core $b$ of the cheese will tend to mount the portion of greatest diameter. The taper, however, is so slight as not to be observable in the drawings.

When the warper is stopped through the breakage of a thread, or from any other cause, the cheeses tend to continue rotating by reason of their momentum, such rotation producing slack in the threads, with consequent danger of tangling or misplacement of the threads. To check the rotation of the cheeses upon stoppage of the warper, I provide suitable means, such, for example, as that shown in Figs. 9, 10 and 11. As represented in said drawings, a bar 23 is slidably mounted in bearings 24 on each bar 14. On the bar 23 are pivoted dogs 25 26 arranged to engage ratchet wheels 27 fixed to the spindles 20. Studs 28 lying within openings 29 in said dogs limit pivotal movement of the dogs.

When replenishing the cheeses in the creel, the operator usually finds it convenient to handle the cheeses in such a way that the cheeses on one side of each tree rotate or unwind in one direction, and those on the other side rotate in the opposite direction; accordingly, the dogs 25 are constructed to check rotation in one direction, and the dogs 26 to arrest rotation in the opposite direction.

When the apparatus is in operation, the bars 23 are elevated so as to hold the dogs 25 26 out of engagement with the ratchet wheels 27. Said bars may be raised and lowered by any suitable means, as for example, a rock shaft 30 (Figs. 7 and 8) mounted upon the bottom bar 2 of each creel-section, said shaft having fixed thereon a plurality of arms 31 each underlying one of the bars 23. When the shaft is turned to raise the arms 31, the bars 23 will be lifted to withdraw the dogs 25 26 from the ratchet wheels. When the shaft is permitted to move in the opposite direction, the bars drop to place the dogs in engagement with the ratchet wheels. The means for rocking the shaft 30 will be described hereinafter.

When the brake dogs 25 26 are applied to the ratchet wheels 27, the cheeses, by reason of their momentum, rotate upon the spindles 20 until the friction between the spindles and the cores brings the cheeses to a stop. To take up the slack formed in the threads between the time the section beam ceases rotating and the time the cheeses stop, is one of the functions of the rise roll $g$ (Fig. 3). This roll is mounted in bearings on two opposite slide bars 32, said bars being arranged for vertical reciprocation in guides 33 attached to the frame of the warper. Any other suitable means for supporting the rise roll may, however, be employed. Each slide bar 32 is attached by means of a flexible connection 34 with a winding drum 35 (Fig. 5) fixed on a shaft 36 mounted in the warper framework. A weight 37 is attached by means of a flexible connection 38 to each winding drum 35, said weights tending to rotate the drums in the direction to wind up the connections 34 and thus raise the roll $g$. When the warper is operating, the rotation of the beam and the drag of the cheeses cause sufficient tension in the sheet of threads passing over the rise roll to hold the latter approximately in the plane of the guide rolls $f$ $h$; but when said tension is relieved by the stoppage of the beam, the roll $g$ is permitted to rise, whereby the slack in the threads is taken up.

The means for stopping the apparatus when a thread breaks has not been illustrated in detail, since it may be of any common form. The drawings show, however, a portion of said stop mechanism, including the drop wires $k$, a lever 39 pivoted at 40, and a weight 41 which actuates the belt-shifting mechanism. Mechanism of this general character is shown in detail in Patent No. 343,119, dated June 1, 1886, to Follansbee.

The means for actuating the creel-brake shafts 30 comprises a rock shaft 42 (Figs. 1 and 3) supported by brackets 43, on which shaft are fixed two arms 44 that overlie two arms 45 fixed to the creel-brake shafts. To the shaft 42 is attached a lever 46 carrying a weight 47 which tends to turn the shaft 42 in the direction to allow the dog-supporting bars 23 to drop into operative position. The lever 46 is arranged to be released to the action of the weight 47 through the stoppage of the warper, and is arranged to be returned to normal position through power-driven means that is rendered effective when the warper has been again started and has taken up the slack. Said power-driven restoring means comprises, in the present embodiment, a shaft 48 (Fig. 1) supported in bearing brackets 49 and 50 and arranged to be continuously rotated by means of a belt (not shown) running over a pulley 51 fixed on said shaft. Also fixed on the shaft 48 is a ratchet wheel 52 (Figs. 16 and 18). An arm 53 is loosely mounted on the shaft 48. A pivot pin 54 is mounted in a bearing in said arm, and has fixed thereto a pawl 55 arranged to be engaged by the ratchet wheel 52. The lever 46 is connected to the arm 53 by means of a link 56. Means is provided for holding the arm 53 in the position shown in Fig. 18, against the action of gravity, in which position the arms 45 are held depressed and the dog-supporting bars 23 are held in their upper or inoperative position. When the arm 53 is released, gravity causes it to swing into the position indicated in Fig. 3, whereby the bars 23 are permitted to drop to place the dogs 25 26 in engagement with the ratchet wheels 27 and stop the rotation of the cheeses. When the cheeses are to be released, means to be later described swings the pawl 55 into contact with the constantly rotating ratchet wheel, whereupon said wheel swings the arm 53 up into its initial or normal position. The means for holding the arm in its initial position, and for throwing the pawl 55 into and out of coaction with the ratchet wheel will now be described.

Fixed to the pivot pin 54 is an arm 57. The pivotal movement of the pawl 55 away from the ratchet wheel is limited by a stop pin 58 (Fig. 18) on the arm 53. A tension spring 59 is strained between a pin 60 on the pawl and a pin 61 on the arm 53. When the parts are in the position shown in Fig. 19, the spring 59 holds the pawl 55 in engagement with a ratchet tooth; when the pawl is moved away from the ratchet wheel until the pin 60 is at the other side of a straight line drawn through the centers of the pins 54 and 61, the spring 59 moves the pawl still farther away from the wheel, until the arm 57 strikes the stop pin 58. The means for disengaging the pawl from the wheel as the arm 53 approaches its normal position consists of a cam projection 62 located on the bracket 49 in position for the pin 60 to ride up thereon. The means for supporting the arm 53 in its initial position comprises an arm 63 fixed upon a rock-shaft 64 mounted in a bracket 65 on the bracket 49. The arm 63 has rigidly attached thereto an abutment 66 against which a stop pin 67 on the arm 57 normally bears. When the arm 63 is swung to withdraw the abutment from beneath the stop pin 67, the arm 53 gravitates into the position represented in Fig. 3. The means for thus swinging the arm 63 comprises a lever 68 fixed on the rock shaft 64, one end of said lever being acted upon by a tension spring 69, and the other end being connected by a link 70 to a lever 71. The last mentioned lever is pivotally supported at one end in a bracket 72 (Fig. 17), the other end of said lever underlying a projection 73 on one of the rise-roll-supporting bars 32. It will be seen that when the roll $g$ rises, as it does when the section beam stops, the spring 69 will be permitted to rock the shaft 64 and thus withdraw the abutment 66 from beneath the stop pin 67, thus causing an application of the brakes to the cheeses. When the section beam is again placed in rotation, the descending rise roll, acting through the projection 73, lever 71, link 70, and lever 68, will cause the shaft 64 to turn into its normal position. By such turning movement, an arm 74 fixed on said shaft is swung against the pin 60, whereby the pawl is thrown into contact with the rotating ratchet wheel 52, which swings the arm 53 up to its normal position. Before the stop pin 67 strikes the abutment 66, the pawl is withdrawn from the ratchet wheel by the cam projection 62.

75 is an angular safety stop fixed to the arm 74 and serving by impingement upon the bracket 65 to prevent excessive return movement of the arm 63.

Referring now to the improvement in the means for actuating the rise roll $g$: There are slight differences in the braking efforts which the spindles 20 exert on the cheeses when the spindles are stopped by the dogs 26. Consequently at any given stop the cheeses tend to coast different amounts. Therefore, in order to prevent one or more slack threads from occurring in the warp when the warper stops, it is necessary to apply sufficient force to the rise roll during stopping so that the cheeses shall coast a little farther than they would if they were disconnected from the beam at the instant of application of the dogs 26, differences in the extent of coasting of the various cheeses simply resulting in slight differences in the tension of the threads. The weights 37, only one of which is to be seen in the drawings, are sufficiently heavy to apply the necessary force to the rise roll during stopping so as to make the coasting of all the cheeses at least equal to that of the one which tends to coast the most. Normally, the rise roll should be positioned about in line with the guide rolls $f$ and $h$, but in such position the threads are so nearly straight that their downward pressure on the rise roll is insufficient to support the heavy weights 37. I therefore provide means which acts during the normal operation of the machine to counterbalance the excess weight of the masses 37.

Referring to Figs. 20 and 21: 76 is a weight which is vertically slidable on a guide 77. On one side of said weight is pivoted a latch 78 that is normally held against a stop pin 79 by a spring 80 acting upon an arm 81 rigid with the latch. When the weight 76 is not in use, it rests upon the frame member 82. On one of the bars 32 is fixed a projection 83 adapted, when said bar descends, to pass below the hook of the latch 78. To the weighted lever 39 is attached an arm 84 that is arranged to strike the arm 81 and disengage the latch 78 from the projection 83.

When a thread breaks, the detector mechanism causes the weighted lever 39 to be released, whereupon said lever actuates the belt-shifter and a brake beam (not shown) to stop the rotation of the section beam in the usual manner. The downward swing of the lever 39 at the same time moves the arm 84 against the arm 81, thus releasing the counterbalance weight 76 from the rise-roll bar 32. The heavy weights 37 are thereby enabled to force the rise roll up to maintain all of the threads taut.

When the section beam is again set in rotation, the cheeses being still braked, the tension upon the threads becomes sufficient to depress the rise roll somewhat below its normal position, until the projection 83 on one of the bars 32 passes below the hook of the latch 78. About the time the projection 83 reaches this position, the projection 73 on the bar 32 at the opposite side of the warper causes the cheese brakes to be released. As soon as the cheeses begin rotating, the tension upon the threads is slightly decreased, the roll $g$ rises, and the weight 76 is lifted off the bar 82. The weights 37, when thus counterbalanced by the weight 76, are just sufficient to keep the rise roll in the desired running position.

The section beam $o$ may be rotated in any suitable way, as by means of the usual drum 85 (Fig. 3) making frictional driving contact with the periphery of the yarn mass on the beam. The shaft or journals of the beam are mounted in the outer ends of arms 86 which are pivoted at 87. To prevent the yarn mass upon the beam from becoming eccentric, any suitable means may be provided, as, for example, that shown in Fig. 3. Upon a shaft 88 are fixed two cams 89, one beneath each arm 86. Connected to each cam is a sheave or pulley 90 to which is attached one end of a cable 91 supporting a weight 92. It will be seen that the weights 92 press the cams 89 against the lower side of the arms 86. When for any reason the beam jumps, the cams 89 follow the arms 86 in their upward movement and prevent the beam from dropping back. Such upward movement of the beam, however, is so slight as not to break the frictional driving contact between the drum and the yarn mass.

From the foregoing detailed description of one embodiment of the invention it will be seen that the improved creel construction, the creel brakes, and the improved slack-take-up contribute to the attainment of a much higher speed of operation than has heretofore been possible.

I would have it understood that the invention is not limited to the details and arrangement of parts herein set forth.

I claim as my invention:

1. A warping apparatus having, in combination, a creel for supporting a plurality of yarn carriers, brakes to stop the yarn carriers, means for rotating a section beam to draw yarn from the yarn carriers, a roller arranged to bear against the yarn extending from the creel to the section beam, detectors arranged to cause stoppage of the beam, a weight for moving the roller to take up slack, a counterbalance weight, means for automatically connecting said counterbalance weight to said roller when the latter is forced by the tension of the threads out of slack-take-up position, said counterbalance weight being arranged to be automatically disconnected from the roller when a detector acts, and means actuated in the slack-take-up movement of the roller to cause application of the creel brakes.

2. A warping apparatus having, in combination, a creel for supporting a plurality of yarn carriers, brakes to stop the yarn carriers, means for rotating a section beam to draw yarn from the yarn carriers, a roller arranged to bear against the yarn extending from the creel to the section beam, detectors arranged to cause stoppage of the beam, means tending to move the roller to take up slack, means for partially counteracting said roller-moving means, said counteracting means being arranged to be rendered ineffective when a detector acts, and means actuated in the slack-take-up movement of the roller to cause application of the brakes.

3. A warping apparatus having, in combination, a creel for supporting a plurality of yarn carriers, brakes to stop the yarn carriers, said brakes tending to move into "applied" position, means for holding the brakes in "released" position, means tending to withdraw the holding means, a roller bearing against the yarn extending from the creel, means tending to move the roller to take up slack, means for partially counteracting said roller-moving means, and means for rendering the counteracting means ineffective, said roller controlling the withdrawing means.

4. A warping apparatus having, in combination, a creel for supporting a plurality of yarn carriers, brakes to stop the yarn carriers, said brakes tending to move into "applied" position, means for holding the brakes in "released" position, a roller bearing against the yarn extending from the creel, means tending to move the roller to take up slack, means for partially counteracting said roller-moving means, means to render said counteracting means ineffective, and means actuated in the slack-take-up movement of the roller for withdrawing said holding means.

5. In a creel-braking mechanism, a brake-controlling lever having an "applied" and a "released" position, said lever tending to move into applied position, a rotatory wheel, means connected to said lever and adapted for connection to said wheel for moving said lever into released position, and means for holding said lever in released position.

6. A warping apparatus having, in combination, a creel for supporting a plurality of yarn carriers, brakes to stop the yarn carriers, means to render the brakes wholly inoperative except when the carriers are to be stopped, a roller bearing against the yarn extending from the creel, and means operable by said roller for suddenly withdrawing the means that renders the brakes inoperative.

7. In a creel, a frame, a tree rotatably mounted in said frame, a pivot pin attached to said tree, a spindle rotatably mounted on said pin, a braking element attached to the spindle, a cooperating braking element on the tree, and means supported for rotation with the tree for causing coaction between said braking elements.

8. In a creel-braking mechanism, a brake-controlling lever having an "applied" and a "released" position, a continuously rotated shaft, a ratchet wheel on said shaft, an arm loosely mounted on said shaft and connected to said lever for moving the latter, a pawl movably mounted on said arm and arranged to be engaged by said ratchet wheel, means for holding said arm to hold said lever in one of its positions, and means for releasing said arm to permit movement of the lever into its other position.

9. In a creel-braking mechanism, a brake-controlling lever having an "applied" and a "released" position, a continuously rotated shaft, a ratchet wheel on said shaft, an arm loosely mounted on said shaft and connected to said lever for moving the latter, a pawl movably mounted on said arm and arranged to be engaged by said ratchet wheel, means for holding said arm to hold said lever in one of its positions, and thread-controlled means for releasing said arm to permit movement of the lever into its other position.

10. In a creel-braking mechanism, a brake-controlling lever having an "applied" and a "released" position, a continuously rotated shaft, a ratchet wheel on said shaft, an arm loosely mounted on said shaft and connected to said lever for moving the latter, a pawl movably mounted on said arm and arranged to be engaged by said ratchet wheel, means for holding said arm to hold said lever in one of its positions, means for releasing said arm to permit movement of the lever into its other position, and means for moving the pawl into engagement with the ratchet wheel to cause movement of said arm into its initial position.

11. In a creel-braking means, a brake-controlling lever having an "applied" and a "released" position, a rotatable shaft, a ratchet wheel fixed on said shaft, an arm loosely mounted on said shaft and having a link connection with said lever for moving the latter, a pawl pivoted on said arm and adapted to engage said ratchet wheel, a pivoted arm having an abutment arranged to support the first mentioned arm, yarn-controlled means for swinging the second mentioned arm to withdraw said abutment, means moving with the second mentioned arm for moving the pawl into engagement with the ratchet wheel to cause a restoring movement of the first mentioned arm, and means for disengaging the pawl from the ratchet wheel upon the completion of such restoring movement.

12. In a creel, a frame, a tree rotatably mounted in said frame, said tree being adapted to rotatably support a plurality of yarn masses, braking elements supported on the tree, there being one such element for each yarn mass, and a member supported for rotation with the tree for controlling the operation of said braking elements.

13. The combination of a creel, brakes for the creel, means to lock the creel brakes in released position, said warper including a thread tension roller, and connections between the roller and said brake-locking means for suddenly withdrawing the latter near the beginning of a slack take-up movement of said roller.

14. A warping apparatus having, in combination, a creel for rotatably supporting spindles, each spindle being adapted to rotatably support a tubular yarn carrier, means for rotating a section beam to draw yarn from the yarn carriers, devices to suddenly stop rotation of the spindles, and means to take up slack caused by the rotation of the yarn carriers after the spindles have been stopped, the slack-take-up means being arranged to operate said spindle-stopping devices.

15. In a creel, a stationary series of thread guide bars, a frame movably supported for movement into and out of operative position alongside said series of thread guide-bars, yarn mass supports in said frame, and means for locating the frame in operative position.

16. In a creel, a stationary series of thread guide bars, a frame supported for movement into and out of operative position alongside said series of thread guide bars, and a plurality of vertical series of yarn mass supports in said frame each of said guide bars being of substantially the same length as one of said series of yarn mass supports.

17. A warping apparatus having, in combination, a series of pivots, a spindle rotatably mounted on each pivot and adapted to fit within a tubular yarn carrier, said carrier being adapted to rotate with relation to the spindle, devices to stop rotation of the spindles, means for rotating a section beam to draw yarn from the yarn carriers, and means to take up slack caused by the rotation of the yarn carriers after the spindles have been stopped.

18. In combination, a creel, brakes for the creel, said brakes tending to move into applied position, means for holding the brakes in released position, means tending to withdraw the holding means, a stop which normally restrains said withdrawing means, and a roller bearing against the yarn extending from the creel, said roller controlling the stop.

19. In combination, a creel, brakes for the creel, a roller bearing against the yarn extending from the creel, said roller being arranged to yield under the tension of the yarn, power means for releasing the brakes, and means actuated near the end of the yielding movement of the roller for throwing the power means into operation.

20. In combination, a creel, brakes for the creel, a roller bearing against the yarn extending from the creel, a member moving with the roller, the latter being arranged to be restored to aproximately normal position by the tension of the yarn, power means for releasing the brakes, and devices for throwing the power means into operation, said devices including a part located near the end of the restoring movement of said member and arranged to be engaged by said member.

21. In combination, a creel, brakes for the creel, a roller bearing against the yarn extending from the creel, power means for releasing the brakes, and means controlled by said roller for throwing the power means into operation.

22. In a creel-braking mechanism, a brake-controlling lever having an "applied" and a "released" position, means for holding said lever in released position, a thread tension roller, spring-actuated means controlled by said roller for withdrawing said holding means, power means for moving the lever into released position, and means controlled by said roller for throwing the power means into operation.

23. In a creel-braking mechanism, a brake-controlling lever having an "applied" and a "released" position, means for holding the lever in released position, a thread tension roller, means controlled by said roller for withdrawing said holding means, and means also controlled by said roller for moving the lever into released position.

24. A warping apparatus having, in combination, a series of pivots, a spindle rotatably mounted on each pivot and adapted to fit within a tubular yarn carrier, said carrier being adapted to rotate with relation to the spindle, dog-and-ratchet devices to suddenly stop rotation of the spindles, and means for rotating a section beam to draw yarn from the yarn carriers, the yarn carriers being arranged to rotate for a while after the spindles have been stopped.

25. A warping apparatus having, in combination, a series of rotatable spindles each adapted to fit within a yarn carrier, said carriers being adapted to rotate with relation to their respective spindles, devices to stop rotation of the spindles, and means for rotating a section beam to draw yarn from the yarn carriers, the yarn carriers being adapted to rotate for a while after the spindles have been stopped.

26. A warping apparatus having, in combination, a series of rotatable spindles each adapted to fit within a yarn carrier, said carriers being adapted to rotate with relation to their respective spindles, devices to stop rotation of the spindles, means for rotating a section beam to draw yarn from the yarn carriers, and means to take up slack caused by rotation of the yarn carriers after the spindles have been stopped.

27. A warping apparatus having, in combination, a series of rotatably supported spindles, each spindle being adapted to rotatably support a yarn carrier, a brake element fixed to each spindle, brake devices arranged to engage said brake elements to stop the rotation thereof, the friction between the braked spindles and the yarn carriers causing said yarn carriers to stop, and means for rotating a section beam to draw yarn from the yarn carriers.

28. A warping apparatus having, in combination, a creel having devices for rotatably supporting and braking yarn masses, and a warper having a slack take-up roll, a weight for actuating the slack take-up roll, said weight being so proportioned to the creel brakes that the slack take-up roll causes the yarn masses in the creel to revolve after the creel brakes otherwise would have stopped said yarn masses, and means for partially counterbalancing said weight during the normal operation of the warper.

29. A warping apparatus having, in combination, a creel having devices for rotatably supporting and braking yarn masses, and a warper having a slack take-up roll, a weight for actuating the slack take-up roll, said weight being so proportioned, to the creel brakes that the slack take-up roll causes the yarn masses in the creel to revolve after the creel brakes otherwise would have stopped said yarn masses, detector mechanism arranged to stop the warper, a counterbalance weight arranged to be connected to said roll, and means for disconnecting the counterbalance weight from the roll when the detector mechanism operates.

In testimony whereof I affix my signature in presence of two witnesses.

HOWARD D. COLMAN.

Witnesses:
HARRY A. SEVERSON,
LOUISE A. CULVER.

It is hereby certified that in Letters Patent No. 1,208,295, granted December 12, 1916, upon the application of Howard D. Colman, of Rockford, Illinois, for an improvement in "Warping Apparatus," an error appears in the printed specification requiring correction as follows: Page 4, line 45, for the words "brake beam" read *beam brake;* and that the said Letters Patent should be read with this correction therein that the same may conform to the record of the case in the Patent Office Signed and sealed this 16th day of January, A. D., 1917.

[SEAL.]

F. W. H. CLAY,
*Acting Commissioner of Patents*

Cl. 242—131.